March 24, 1964　　　G. M. CAMERON　　　3,125,806
MANUFACTURE OF COMPOSITE METAL TUBES
Filed Jan. 30, 1961　　　3 Sheets-Sheet 1
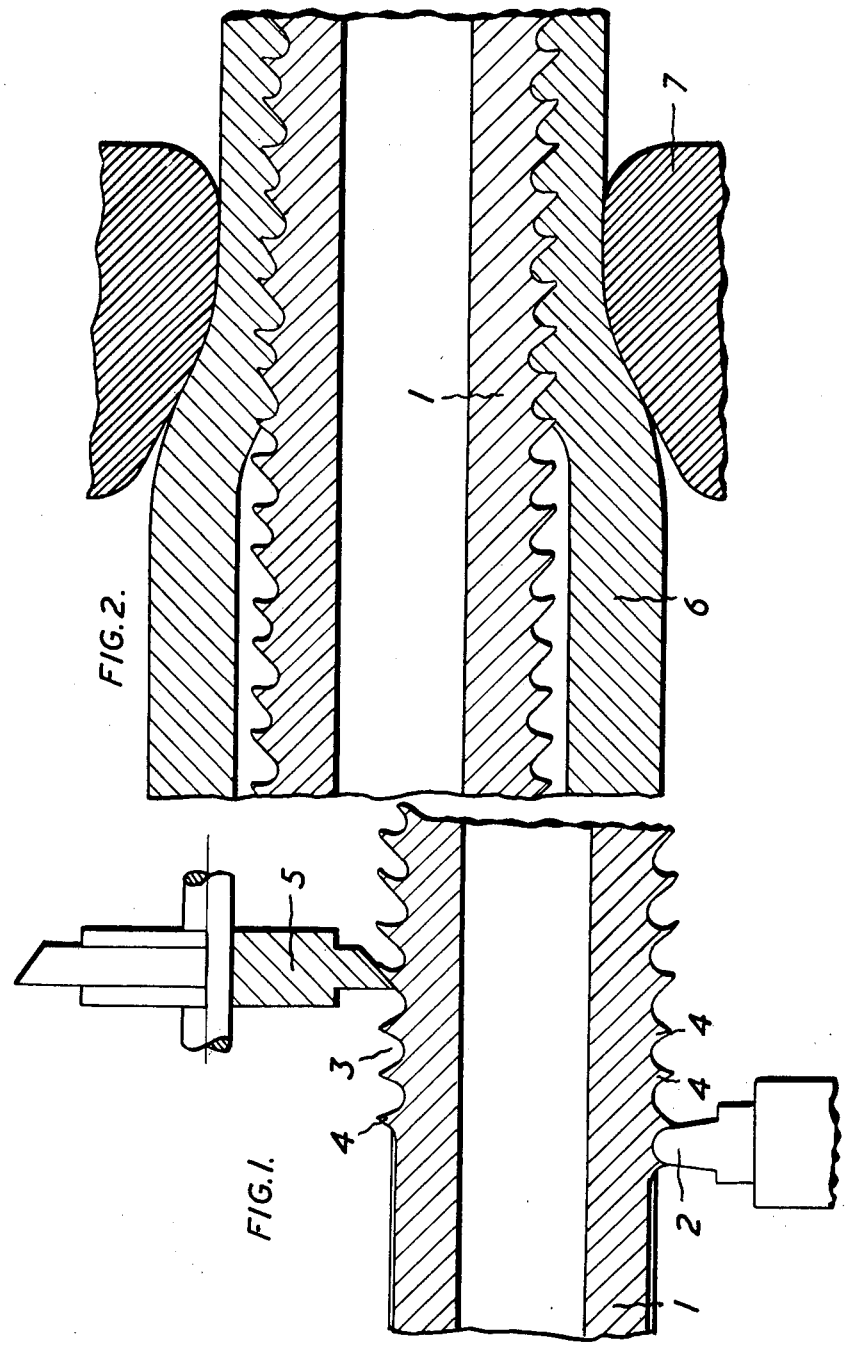

March 24, 1964 G. M. CAMERON 3,125,806
MANUFACTURE OF COMPOSITE METAL TUBES
Filed Jan. 30, 1961 3 Sheets-Sheet 2

Inventor
Graham M. Cameron
By
Kenyon, Palmer Stewart & Estabrook
Attorneys

March 24, 1964     G. M. CAMERON     3,125,806
MANUFACTURE OF COMPOSITE METAL TUBES
Filed Jan. 30, 1961     3 Sheets-Sheet 3

INVENTOR
GRAHAM MURRAY CAMERON
ATTORNEYS 3,125,806
MANUFACTURE OF COMPOSITE METAL TUBES
Graham Murray Cameron, Ashgate, Chesterfield, England, assignor to Howell and Company Limited, Yorkshire, England, a company of Great Britain
Filed Jan. 30, 1961, Ser. No. 85,609
Claims priority, application Great Britain Jan. 30, 1960
7 Claims. (Cl. 29—520)

This invention is concerned with the manufacture of composite metal tubes, that is to say, tubes built up of two (or more) concentric layers, usually of dissimilar metals. There is a requirement for such tubes in the manufacture of heat exchangers, where the metal in contact with the fluid passing through the tube has to have a particular property which is not compatible with the degree of corrosion resistance required for the metal in contact with the other fluid circulating around the tubes. It is of course important in heat exchanger tubes for the contact between the two layers to be intimate in order to ensure good heat transfer, and various known method of constructing such tubes attain this result to a greater or lesser extent. However, the known methods often set severe limitations on the permissible temperature and thermal gradient conditions if one is to avoid the outer layer working free of the inner layer and producing voids which form barriers in the heat path. Also some known methods may leave voids present right from the start.

It is an aim of the present invention to provide a method of manufacturing composite tubes which ensures intimate contact between the layers, giving not only a heat transfer path of low resistance but also a secure mechanical bond.

According to the invention the layers are joined by acting on the outer surface of an inner layer with a tool that forms in it a helical groove or series of annular grooves, each groove or each turn of the helical groove being flanked by at least one ridge forced up from the material of the inner layer, and then acting on these ridges to tilt them all in the same direction, i.e., in the direction of one end of the tube, after which an outer layer, which is initially of an internal diameter such as to clear the ridges, is passed over the inner layer and is then drawn down onto it by passing both layers together through a die. The direction of movement is such that the end towards which the ridges are tilted enters the die first.

In a typical example the inner layer is of mild steel and the outer layer is of aluminium or an aluminium alloy. The subsequent tilting of the ridges formed in the initial grooving operation results in a very effective mechanical keying of the inner and outer layers together, and the good heat transfer resulting from the intimate contact is further assisted by the fact that the mutual area of contact is substantially greater than would be present in the case of a smooth cylindrical interface.

The accompanying drawings illustrate the process according to the invention diagrammatically. In these drawings:

FIGURE 1 is a sectional elevation through the inner tube, showing the formation of the groove and ridges; and FIGURE 2 shows the drawing down of the outer layer onto the inner layer.

Figures 3, 4:
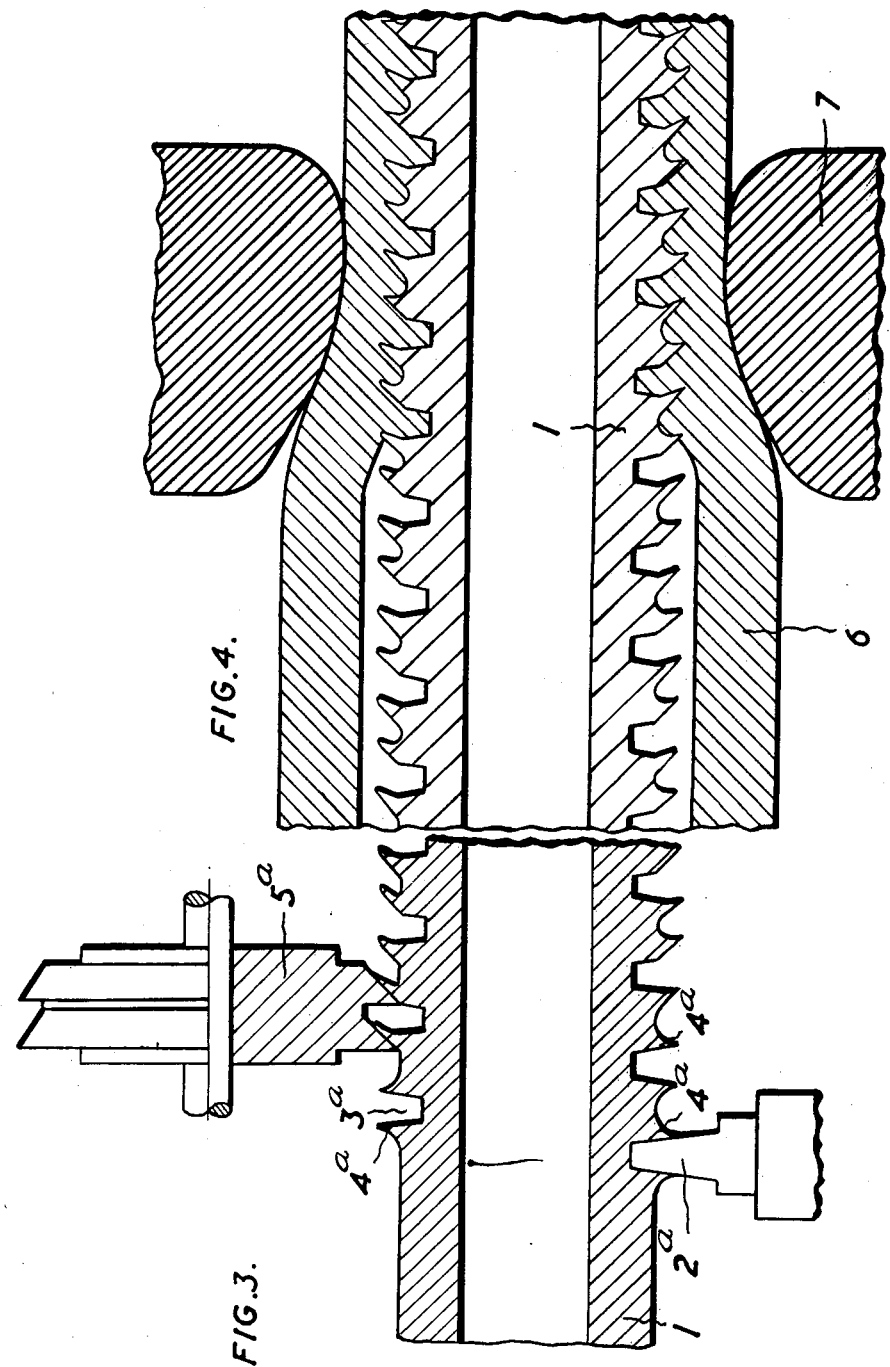
FIGURES 3 and 4 are views similar to FIGURES 1 and 2, showing an alternative form for the groove and ridges.

Referring to FIGURE 1, a tube 1 of mild steel is rotated about its axis in a lathe (not shown) and a tool 2 carried on the lathe saddle and traversing in a direction parallel to the axis engages the outer surface of the tube to form a helical groove, the section of which is a V with an arcuate bottom, as shown at 3. The metal displaced from the groove is forced up into a ridge 4, so that in the profile of the tube the grooves and ridges alternate with one another.

A further tool 5, also carried on the saddle and conveniently disposed on the opposite side of the tube from the tool 2 in order to balance out the forces involved, is in the form of a profiled roller, engaging the tips of the ridges 4 to tilt them over, all in the same direction. The result is a saw-tooth profile.

The roughened tube 1 is then enclosed in a tube 6 of aluminium alloy, which is hammered down onto the tube 1 at that end towards which the ridges 5 are tilted so that the concentric tubes can then be drawn through a die 7 (FIGURE 2) which draws the outer tube tightly down onto the inner one. The diameter of the die is such that the wall thickness of the outer tube is appreciably reduced in the drawing operation and this ensures that the metal flows fully into the grooves 3 and voids are eliminated.

Preferably the outer tube is fitted over the inner one with as little delay as possible after the formation of the groove and ridge, so as to give no time for the formation of an oxide film. The contact of the clean surfaces under high pressure and with a good mechanical key ensures that no void formation or loosening of the two tubes with respect to one another will occur, even at high temperatures.

The exact shape of the grooves is not critical, and in FIGURES 3 and 4 is shown a modified form. Here the tool, shown at 2a in FIGURE 3, is of a shape such as to give the groove 3a a V section with a flat base, and the pitch of the helical path is such, in relation to the width of the tool, as to leave a space between the ridges, shown at 4a, associated with adjacent turns of the groove, so that there are twice as many ridges as grooves in the profile of the tube. The tool for tilting over the tips of the ridges 4a is shown at 5a and has two ridge-engaging portions instead of one. The outer tube 6 is drawn down onto the inner tube by a die 7, as shown in FIGURE 4, in exactly the same manner as shown in FIGURE 2.

Figure 5:
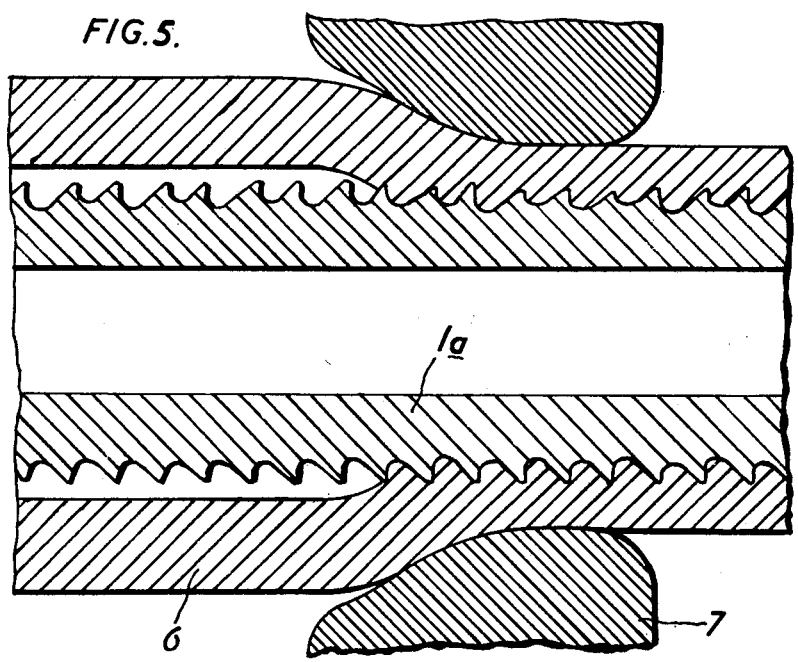
FIG. 5 is a view similar to FIG. 2 showing an alternative embodiment.

It will be understood that the grooves, instead of being helical, could be in the form of a series of annular grooves, independent of one another, but the formation of a single helical groove, as described, is more convenient. For example, and referring to FIG. 5, the outer tube 6 is shown as being drawn down by the die 7 onto an inner tube 1a on which annular grooves have been formed. Also, the invention is not limited to the use of two tubes, as a composite tube could be built up, by the same method, using three or more layers.

The invention is of particular use in the construction of composite finned tubing, especially helically finned tubing. After manufacture of the tube in the manner described above, the fin is wound on. After attachment of the fin, the ends of the tube may have their outer layer removed, and for this purpose the grooving and ridging of the inner tube may be confined to that length of the inner tube over which the outer layer is to remain.

I claim:
1. A method of forming a composite metal tube built up of at least two concentric layers, said method comprising a first step of acting on the outer surface of an inner tube with a tool that forms in it a groove extending helically around the tube and extending substantially the entire length of said inner tube, said groove being formed by deformation of the material of the tube by said tool in such a manner as to produce at least one ridge adjacent said groove, a second step of applying to said ridge a tool that tilts said ridge in a direction towards one end of said inner tube, said groove remaining open after tilt- ing of the ridge, a third step comprising placing over said inner tube an outer tube, said outer tube being of softer material than said inner tube, and a fourth step comprising the passing of said outer tube containing said inner tube axially through a die of diameter less than the diameter of said outer tube, said passage being caused in a direction such that said end of said inner tube enters said die first, thereby drawing said outer tube down onto said inner tube, causing said outer tube to form an intimate mechanically interlocked bond with said inner tube, free from voids.

2. A method of forming a composite metal tube as set forth in claim 1, in which said groove is of a profile which is a V with an arcuate bottom.

3. A method of forming a composite metal tube as set forth in claim 1, in which said groove is of a profile which is a V with a flat bottom.

4. A method of forming a composite metal tube as set forth in claim 1, in which said tool causing the said ridge is in the form of a roller.

5. A method of forming a composite metal tube as set forth in claim 1 wherein said inner tube is of mild steel and said outer tube is of an aluminium alloy.

6. A method of forming a composite metal tube built up of at least two concentric layers, said method comprising a first step acting on the outer surface of an inner tube with a tool that forms in it a groove extending around the tube and extending substantially the entire length of said inner tube, said groove being formed by deformation of the material of the tube by said tool in such a manner as to produce at least one ridge adjacent said groove, a second step of applying to said ridge a tool that tilts said ridge in a direction towards one end of said inner tube, said groove remaining open after tilting of the ridge, a third step comprising placing over said inner tube an outer tube, said outer tube being of softer material than said inner tube, and a fourth step comprising the passing of said outer tube containing said inner tube axially through a die of diameter less than the diameter of said outer tube, said passage being caused in a direction such that said end of said inner tube enters said die first, thereby drawing said outer tube down onto said inner tube, causing said outer tube to form an intimate mechanically interlocked bond with said inner tube, free from voids.

7. A method of forming a composite metal tube built up of at least two concentric layers, said method comprising a first step of acting on the outer surface of an inner tube with a tool that forms in it a series of annular grooves extending around the tube, said grooves being formed by deformation of the material of the tube by said tool in such a manner as to produce at least one ridge adjacent each groove, said series of grooves extending along substantially the entire length of said inner tube, a second step of applying to said ridges a tool that tilts said ridges in a direction towards one end of said inner tube, said grooves remaining open after tilting of the ridges, a third step comprising placing over said inner tube an outer tube, said outer tube being of softer material than said inner tube, and a fourth step comprising the passing of said outer tube containing said inner tube axially through a die of diameter less than the diameter of said outer tube, said passage being caused in a direction such that said end of said inner tube enters said die first, thereby drawing said outer tube down onto said inner tube, causing said outer tube to form an intimate mechanically interlocked bond with said inner tube, free from voids.

References Cited in the file of this patent
UNITED STATES PATENTS

| | | |
|---|---|---|
| 1,179,853 | McCulloch | Apr. 18, 1916 |
| 2,026,774 | Davis et al. | Jan. 7, 1936 |
| 2,046,504 | Cooper | July 7, 1936 |